Patented Jan. 20, 1953

2,626,269

UNITED STATES PATENT OFFICE 2,626,269

AROMATIC HALOSILANES

Arthur J. Barry, Midland, Mich., assignor to Dow Corning Corporation, Midland, Mich., a corporation of Michigan No Drawing. Application February 23, 1949, Serial No. 77,999

6 Claims. (Cl. 260—448.2)

The present invention relates to the preparation of halosilanes. It is particularly concerned with an improved process for the preparation of aromatic halosilanes which contain a halogen atom attached to a carbon atom in the aromatic ring.

Miller and Schreiber, U. S. 2,379,821, disclose reacting hydrocarbons or halohydrocarbons with trichlorosilane in vapor phase at temperatures above 450° C. It is indicated that under these conditions, halogen attached to a benzene ring is a non-reactive substituent.

In the copending application of Barry, De Pree, and Hook, Serial Number 773,926, filed September 13, 1947, now Patent No. 2,511,820, it is shown that under condensed phase reaction conditions at temperatures of from 250° C. to 460° C. chlorobenzene and trichlorosilane react to form phenyltrichlorosilane.

From Miller et al. and Barry et al. it can be concluded that when the temperature is decreased to below 460° the chlorine in the aromatic compound becomes reactive.

It is an object of the present invention to prepare haloaromatic halosilanes. Another object is to provide an improved method whereby an aromatic halohydrocarbon may be reacted with a halosilane without displacement of halogen from the benzenoid ring.

In accordance with the present invention an aromatic halohydrocarbon is reacted with trichlorosilane, $HSiCl_3$, in the presence of boron or aluminum chloride. The reaction is conducted at a temperature of from 235° to 360° C. under sufficient pressure to maintain at least a portion of the reaction mixture in liquid phase. Under these conditions, haloaromatic chlorosilanes are produced in good yield.

The proportion of halohydrocarbon to silane may be varied over a wide range. Preferably, the reaction mixture contains less than 20 mols of either reactant per mol of the other. From a practical standpoint, particularly good results are obtained when the reaction mixture contains approximately equimolecular proportions of halohydrocarbon and trichlorosilane.

Suitable aromatic halohydrocarbons include chlorobenzene, dichlorobenzene and chlorobiphenyl.

The boron or aluminum chloride may be added as such or it may be produced in situ by the addition of materials such as boron fluoride, boric oxide and aluminum oxide. The boron or aluminum chloride is employed in a proportion of at least 0.1% and generally less than 5% based on the total weights of the reactants, though larger proportions may be employed if desired. The boron chloride is readily separable from the reaction product due to its low boiling point. Aluminum chloride has a higher boiling point and may be separated from the reaction products by distillation. When a higher proportion of condensed materials which contain two silicon atoms bonded to a single aryl nucleus is desired, aluminum chloride may be employed. This product may be stripped of unreacted materials, and hydrolyzed either alone or in mixture with other chlorosilanes. The aluminum chloride will be removed from the siloxane by washing.

The reaction may be carried out in any equipment conventionally employed for pressure reactions. A convenient method is to charge a sufficient volume of the reactants into a pressure autoclave that there will remain a liquid phase when the autoclave is heated to a temperature of from 235° to 360° C. Likewise, the reaction may be conducted under pressure in a continuous tube furnace.

Operating in the manner described, there is produced an aromatic chlorosilane which contains an aromatic ring bonded to a silicon atom through a carbon to silicon linkage and a chlorine atom bonded to a carbon atom in said ring.

Example 1

2025 grams chlorobenzene, 2440 grams trichlorosilane and 51 grams boron chloride were introduced into a pressure autoclave of 14.4 liters capacity. The autoclave was then heated to a temperature of 243° C. for 16 hours. A maximum pressure of 400 pounds per square inch was attained. The contents of the autoclave were discharged and distilled. A yield of 134 grams chlorophenyltrichlorosilane, 66 grams phenyltrichlorosilane and 236 grams of distillation residue was thereby obtained.

Example 2

A 14.4 liter autoclave was charged with 2025 grams chlorobenzene, 2440 grams trichlorosilane and 47 grams boron chloride. The autoclave was then heated at 290° C. for 16 hours. A maximum pressure of 800 pounds per square inch was attained. The contents of the autoclave were discharged and distilled. A yield of 690 grams chlorophenyltrichlorosilane, 493 grams phenyltrichlorosilane and 155 grams of distillation residue was obtained.

Example 3

The pressure autoclave described in Example 2 was charged again with the same amounts of chlorobenzene, trichlorosilane and boron chloride. The autoclave was then heated at 348° C. for 16 hours. The contents of the autoclave were discharged and distilled. A yield of 314 grams chlorophenyltrichlorosilane was obtained.

Example 4

2025 grams chlorobenzene, 3444 grams trichlorosilane and 45 grams boron chloride were introduced into a pressure autoclave of 14.4 liter capacity. The autoclave was then heated to a temperature of 276° C. for 16 hours. A maximum pressure of 700 pounds per square inch was attained. The contents of the autoclave were discharged and distilled. A yield of 497 grams chlorophenyltrichlorosilane, 282 grams phenyltrichlorosilane, and 141 grams of distillation residue was thereby obtained.

The distillation residues of Examples 1–4 inclusive were combined and distilled. Bis(trichlorosilyl) chlorobenzene, $(Cl_3Si)_2C_6H_3Cl$, was obtained as a fraction distilling at 180.5°–184° C. at 30 millimeters absolute pressure. This material may be employed as an intermediate for the production of polysiloxanes of utility as resins and lubricants. A mixture of isomers of (chlorophenyl) phenyldichlorosilane $$ClC_6H_4(C_6H_5)SiCl_2$$

which distilled at 208°–213.5° C. at 30 millimeters was liquid at room temperatures. A mixture of liquid and crystalline isomers of bis(chlorophenyl)dichlorosilane distilled at 224°–227° C. at 30 millimeters. Higher boiling chlorosilyl derivatives of chlorobenzene remained as a residue.

Example 5

When 2025 grams of chlorobenzene, 2440 grams trichlorosilane and 52 grams of aluminum chloride are heated in a 14.4 liter autoclave at 300° C. for 16 hours a yield of chlorophenyltrichlorosilane is obtained together with a residue of bis(trichlorosilyl)benzene derivatives.

Example 6

A 50 gallon autoclave was charged with 87 pounds chlorobenzene, 52 pounds trichlorosilane and 1.4 pounds boron chloride. The autoclave was heated at 300° C. for 16 hours. A maximum pressure of 600 pounds per square inch was attained. Distillation of the reaction product yielded 25.6 pounds chlorophenyltrichlorosilane.

Example 7

189 grams of chlorobiphenyl $(ClC_6H_4C_6H_5)$, 135 grams trichlorosilane and 3 grams boron chloride were introduced into a pressure autoclave of one liter capacity. The autoclave was then heated to a temperature of 250°–255° C. for 16 hours. A maximum pressure of 300 pounds per square inch was attained. The contents of the autoclave were discharged and distilled. Chlorobiphenylyltrichlorosilane, $ClC_{12}H_8SiCl_3$, was produced. This compound is of utility for the preparation of siloxanes.

Example 8

When 18 gram mols dichlorobenzene, 18 gram mols trichlorosilane and 45 grams boron chloride are charged to a 14.4 liter autoclave and the autoclave is then heated for 16 hours at 290° C., dichlorophenyltrichlorosilane, $Cl_2C_6H_3SiCl_3$, is produced.

In each of the above examples unreacted chlorohydrocarbon and trichlorosilane may be recovered.

That which is claimed is:

1. The method which comprises reacting an aromatic chlorohydrocarbon containing nuclearly substituted chlorine with trichlorosilane in the presence of a chloride of the group consisting of boron and aluminum chlorides at a temperature of from 235° to 360° C., at least a portion of the reaction mixture being in liquid phase, whereby to produce a trichlorosilyl derivative of said chlorohydrocarbon with the silicon bonded directly to the aromatic ring thereof.

2. The method which comprises reacting an aromatic chlorohydrocarbon containing nuclearly substituted chlorine with trichlorosilane in the presence of boron chloride in amount corresponding to from 0.1 to 5.0 percent by weight based on the total weight of reactants at a temperature of from 235° to 360° C., at least a portion of the reaction mixture being in liquid phase, whereby to produce a trichlorosilyl derivative of said chlorohydrocarbon with the silicon bonded directly to the aromatic ring thereof.

3. The method in accordance with claim 2 in which the chlorohydrocarbon is chlorobenzene.

4. The method in accordance with claim 2 in which the chlorohydrocarbon is dichlorobenzene.

5. The method in accordance with claim 2 in which the chlorohydrocarbon is chlorobiphenyl.

6. $(SiCl_3)_2C_6H_3Cl$.

ARTHUR J. BARRY.

REFERENCES CITED

The following references are of record in the file of this patent:

UNITED STATES PATENTS

| Number | Name | Date |
| --- | --- | --- |
| 2,379,821 | Miller | July 3, 1945 |
| 2,405,019 | Dalin | July 30, 1946 |
| 2,407,181 | Scott | Sept. 3, 1946 |
| 2,469,355 | De Pree | May 10, 1949 |